United States Patent [19]

Lii

[11] Patent Number: 5,181,403
[45] Date of Patent: Jan. 26, 1993

[54] REMOTE-CONTROLLED AUTOMOBILE AND MOTORCYCLE LOCK

[76] Inventor: Jen-Hei Lii, No. 38, Chung-Te 9th Street, Tainan, Taiwan

[21] Appl. No.: 890,073

[22] Filed: May 29, 1992

[51] Int. Cl.$^5$ .................. E05B 67/22; E05B 65/12; B60R 25/08
[52] U.S. Cl. .................. 70/38 C; 70/209; 70/238; 70/226; 70/233; 70/276; 70/256
[58] Field of Search .............. 70/277, 276, 278, 209, 70/211, 212, 226, 237, 238, 225, 227, 254, 256, 257, 233

[56] References Cited

U.S. PATENT DOCUMENTS

| 1,400,415 | 12/1921 | Callahan | 70/227 |
|---|---|---|---|
| 3,779,052 | 12/1973 | Deitch | 70/276 |
| 3,857,262 | 12/1974 | Sidiropoulos | 70/38 C |
| 3,967,479 | 7/1976 | Vick | 70/276 |
| 4,083,424 | 4/1978 | von den Stemmen et al. | 70/278 |
| 4,426,861 | 1/1984 | Chillis | 70/233 |
| 4,660,394 | 4/1987 | Wu | 70/238 |
| 4,779,435 | 10/1988 | Farrow | 70/200 |
| 4,848,110 | 7/1989 | Kuo | 70/38 C |
| 4,974,433 | 12/1990 | Wang | 70/237 |

FOREIGN PATENT DOCUMENTS

| 123116 | 7/1900 | Fed. Rep. of Germany | 70/237 |
|---|---|---|---|
| 2210100 | 1/1989 | United Kingdom | 70/277 |

Primary Examiner—Renee S. Luebke
Assistant Examiner—Darnell M. Boucher
Attorney, Agent, or Firm—Morton J. Rosenberg; David I. Klein

[57] ABSTRACT

A remote controlled automobile and motorcycle lock comprising a U-shaped lock body, a U-shaped hook rod combined with the lock body to be locked therein, an electronic device mounted on a panel fixed inside the lock body, a remote electronic controller to transmit a signal to operate the electronic device to allow the U-shaped hook rod be pulled out of the lock body for unlocking this lock, and an elongated rod screwing with a female threaded post at a rear end of the lock body to hook with brake pedal so as to fix this lock on a part of a steering wheel of an automobile to lock it.

3 Claims, 5 Drawing Sheets

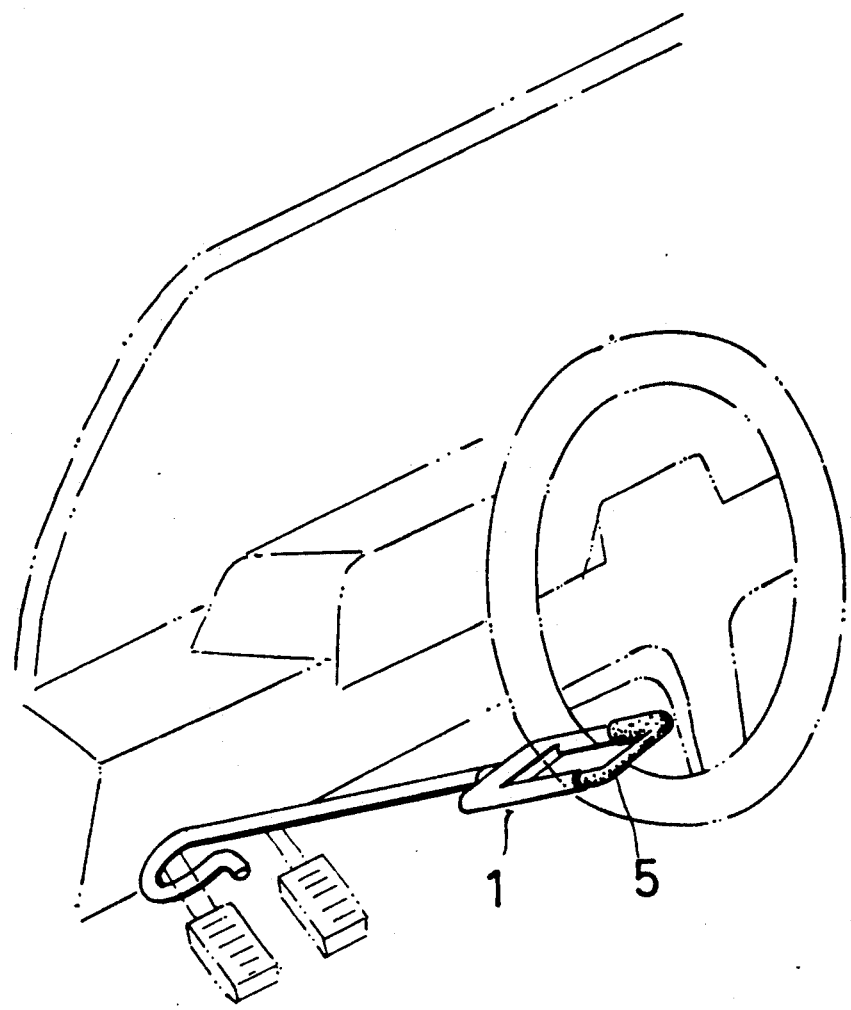
F I G. 5

REMOTE-CONTROLLED AUTOMOBILE AND MOTORCYCLE LOCK

BACKGROUND OF THE INVENTION

Most automobile steering locks or motorcycle locks have mechanical structure to lock a steering wheel of an automobile immovable or to lock a wheel of a motorcycle and to be unlocked with a key. But a key may often be lost to cause inconvenience.

SUMMARY OF THE INVENTION

This invention, a remote-controlled automobile and motorcycle lock has been devised to add an electronic device in a mechanical lock so that the lock has to be unlocked by using, instead of a key, a remote electronic controller to operate an electronic device to allow a hook rod be separated from a lock body in unlocking this lock.

The remote-controlled automobile and motorcycle lock in the present invention, comprises a U-shaped lock body, a U-shaped hook rod, an electronic device mounted on a panel fixed inside the lock body, a battery unit to supply power to the electronic device, an elongated rod, and a remote electronic controller.

To use this lock on an automobile, the lock body and the U-shaped hook rod are combined together to surround a part of threaded post in the lock body and hooking a brake pedal, locking the steering wheel immovable.

To use this lock on a motorcycle, the lock body and the hook rod are combined together to surround two front hydraulic forks, locking a front wheel immovable.

BRIEF DESCRIPTION OF DRAWINGS

The invention will better understood by reference to the accompanying drawings, wherein.

DETAILED DESCRIPTION OF THE INVENTION

Figure 1:
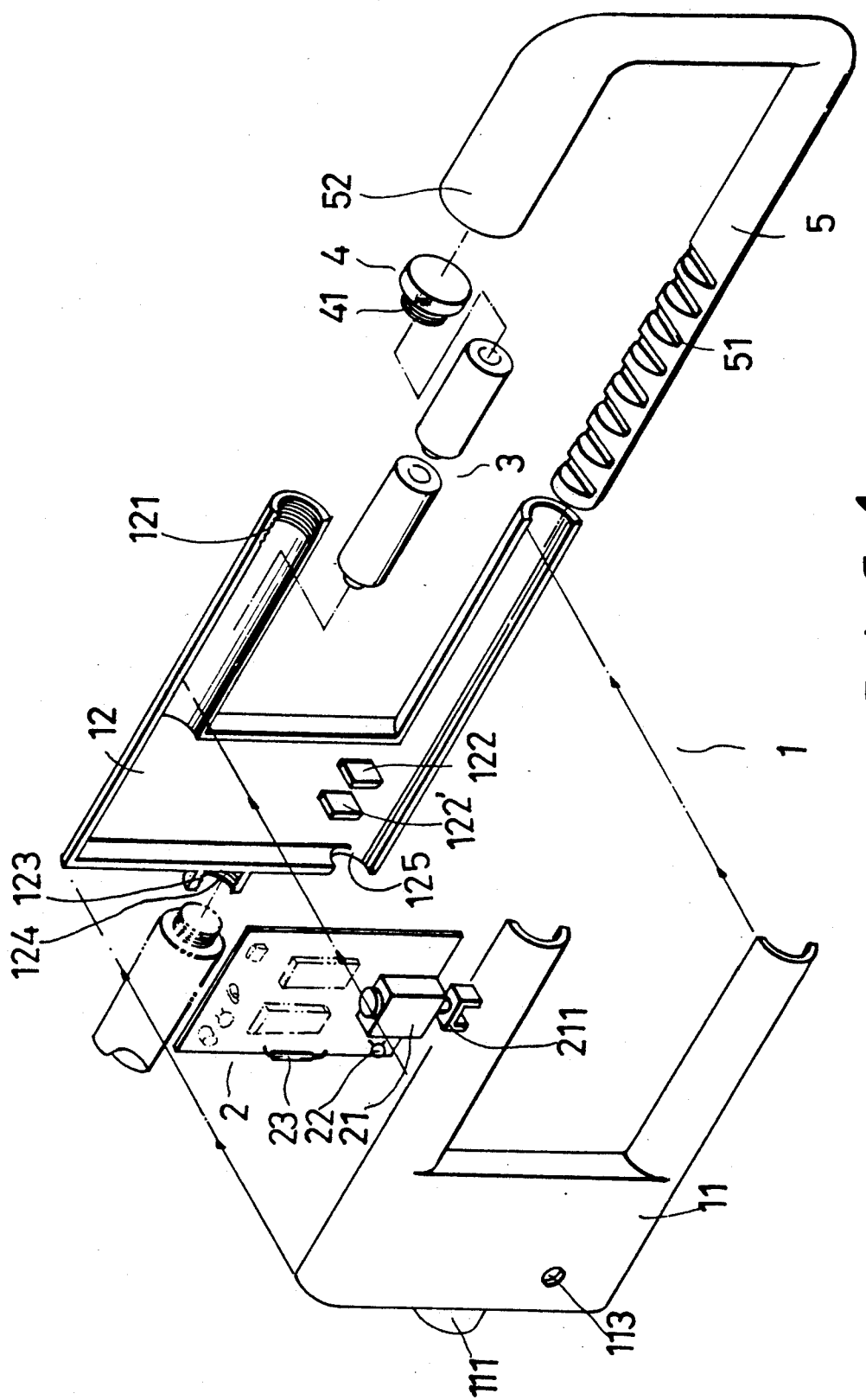
FIG. 1 is an exploded perspective view of the remote-controlled automobile and motorcycle lock in the present invention.

The remote-controlled automobile and motorcycle lock in the present invention, as shown in FIG. 1, comprises a U-shaped lock body 1, an electronic device mounted on a panel 2, a battery unit 3, a cap 4, a U-shaped hooking rod 5, an elongated rod 6, a remote electronic controller.

The U-shaped lock body 1 consists of a U-shaped left half body 11 and a U-shaped right half body 12 combined together. The left half body 11 has a left half post 111 extending rearward from the middle of an end surface of a vertical portion, and a small hole 113 bored in a proper location in the vertical portion. The left half post 111 is provided with a female thread 112. The left and the right half body 11, 12 respectively have a female thread 121, 121 in a free end of the upper arm of two parallel arms and two sidewise position blocks 122, 122' spaced apart in parallel on the inside vertical portion. The right half body 12 has right half post 123 extending rearward from the middle of an end surface of a vertical portion to fit together with the left half post 111. The right half post 123 also has a half female thread 124 to form a complete female thread with the counterpart thread 112. The right half body 12 also has an opening 125 in the lower end surface.

The electronic device mounted on the panel 2 includes a magnetic switch 21 connected with an inverted U-shaped member 211, an LED lamp 22, spring switch 23, a receiver 24, a comparator 25, an amplifier 26, and a decoder 27. The inverted U-shaped member 211 is located between the two parallel position blocks 122, 122' fixed on an inner wall of the right half lock body 12, and is always biased by a spring placed between the member 211 and the magnetic switch 21 to extend down to engage two of a plurality of grooves 51 in a lower arm of a hook rod 5.

The battery unit 3 supplies power to the electronic device, being placed in the upper arms of the right half body 12 and the left half body 11.

The cap 4 is T-shaped having a male-threaded portion to screw with the female thread 121 in the end of the upper arm of the right half body 12 and the left half body 11 to keep the battery unit 3 in position, by closing the end of the upper arm.

The U-shaped hook rod 5 has a lower long solid arm in parallel to a upper short tubular arm 52, and the long solid arm has a plurality of grooves 51 equally spaced apart in its outer half length. Each groove 51 has a vertical wall near to the free end and a sloped wall far from the free end and being fitted in by two feet in the inverted U-shaped member 211 combined under the magnetic switch 21 so as to stop the outward movement (unlocking movement) of the hook arm 5 in locking this lock.

Figure 2:
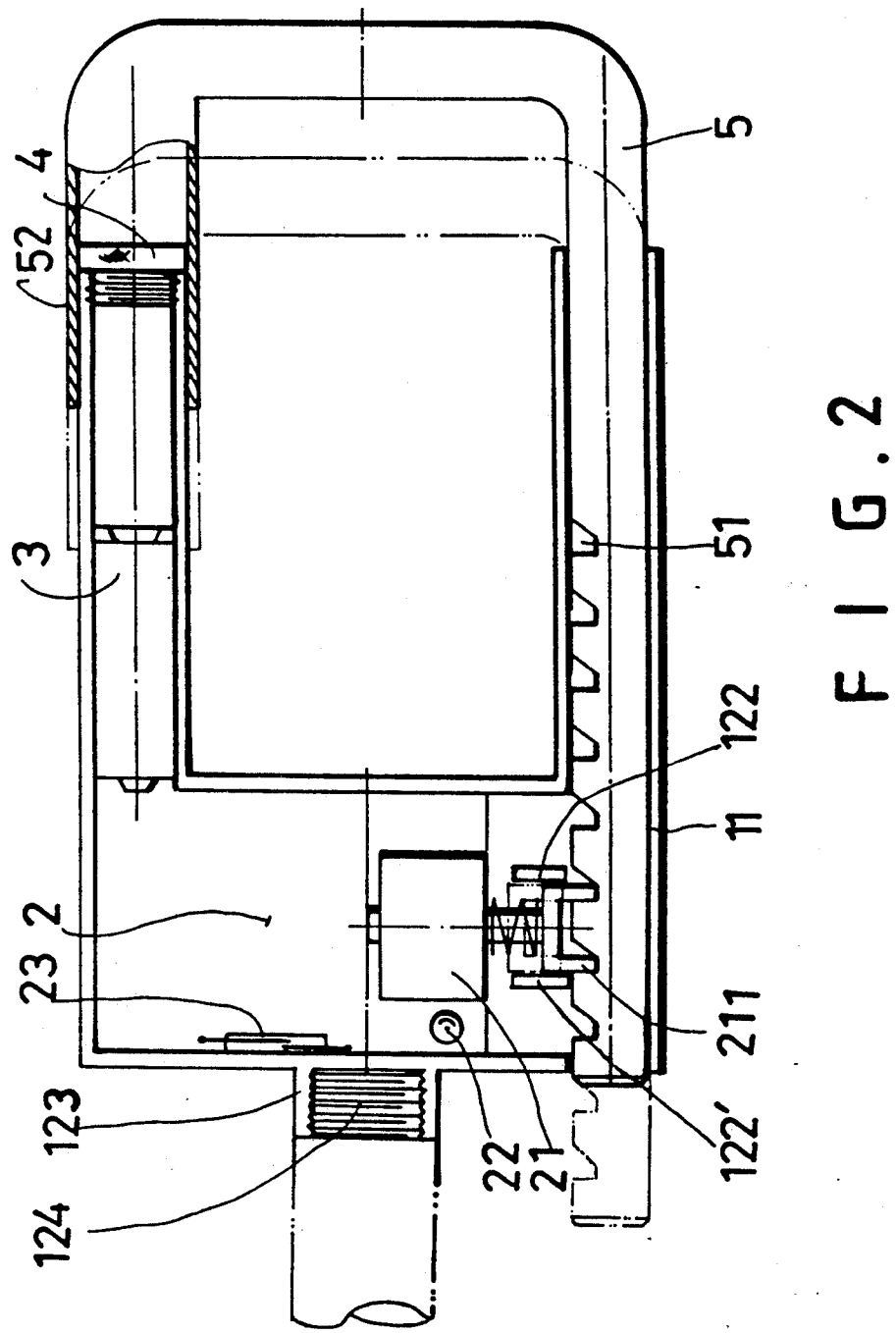
FIG. 2 is an upside and part cross-sectional view of the remote-controlled automobile and motorcycle lock in the present invention.

In assembling this lock, as shown in FIG. 2, the panel 2 mounted with the electronic device is to be fixed on the inside wall of the right half body 12, with the U-shaped member 211 fitted between the two parallel position blocks 122, 122' under the magnetic switch 21. Next, the battery unit 3 is to be inserted in the upper arm in the right half body 12 to supply power to the electronic device, and lastly, the left half body 11 is to be combined with the right half body 12, letting the LED lamp 22 fit in the hole 113 in the left half body 11, and then the cap 4 is screwed with the female thread in the end of the upper arm in the lock body 1 to keep the battery unit 3 securely in the upper arm.

Figure 3:
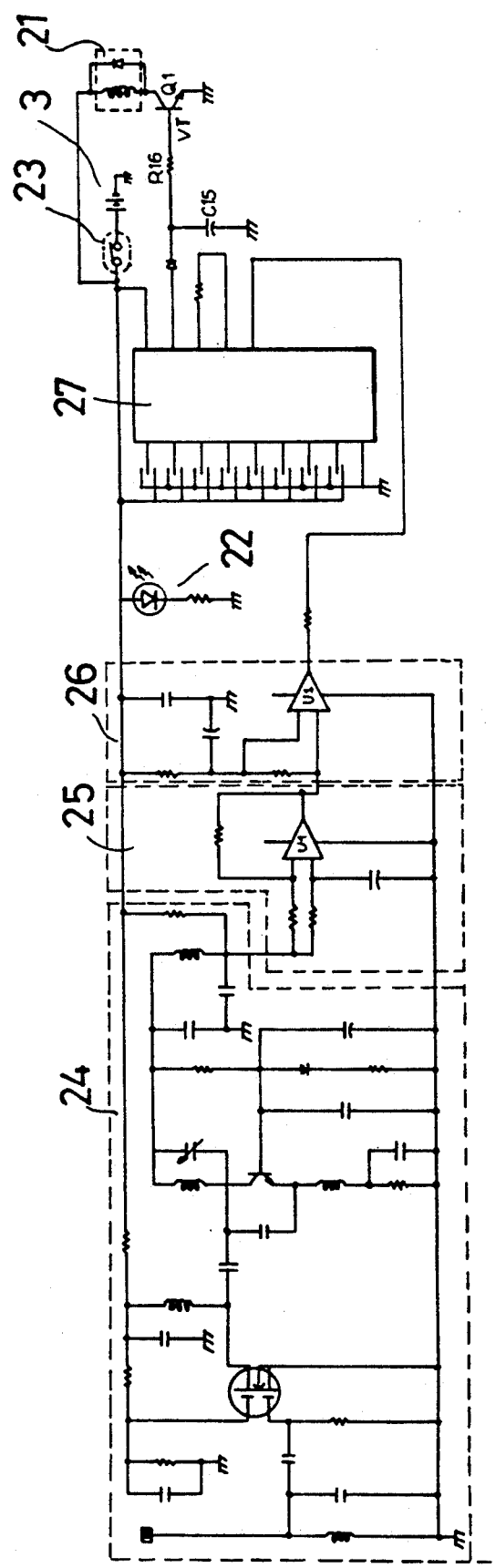
FIG. 3 is a diagram of an electronic device in the remote-controlled automobile and motorcycle lock in the present invention.

The electronic device as shown in FIG. 3, has a receiver 24 to receive an wireless signal from a remote electronic controller, a comparator 25 to compare the signal coming from the receiver 24 and to send out a voltage to an amplifier 26, which then amplifies the voltage and feeds the amplified voltage to the decoder 27, which checks a modulate secret code and then sends out a mono pulse from the 17th pin to a transistor Q1. Then the magnetic switch 21 is to be turned on by the transistor Q1 for a period of time determined by the value of a resistor R16 and a capacitor C15. In consequence, the magnetic switch 21 generates magnetism to pull up the inverted U-shaped member 211 against a biasing spring put between the member 211 and the switch 21 so that the two feet of the member 211 can separate from any of the grooves 51 in the lower arm of the hook arm 5, which is then possible to be pulled out of the lock body 1, unlocking this lock during the period of time the U-shaped member 211 is sucked up by the magnetic switch 21.

Figure 4:
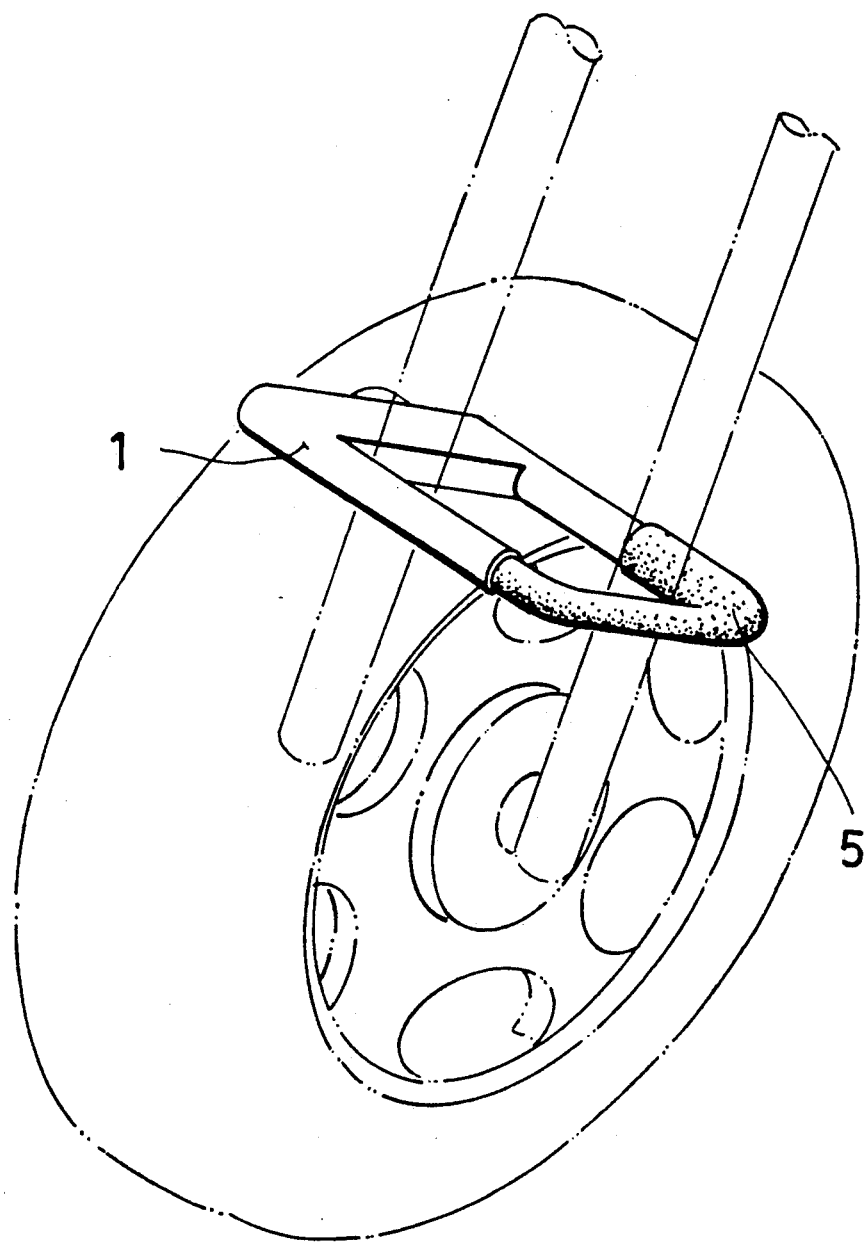
FIG. 4 is a perspective view of the remote-controlled automobile and motorcycle lock applied to lock a wheel in a motorcycle in the present invention; and, FIG. 5 is a perspective view of the remote-controlled automobile and motorcycle lock applied to lock a steering wheel in an automobile in the present invention.

In practical appliance of this lock, for example, to lock a front wheel in a motorcycle, as shown, in FIGS. 2, 4, the hook rod 5 is to be fitted in the lock body 1, with the tubular portion 52 shoved to fit around the upper arm in the lock body 1 and with the lower arm with the grooves 51 shoved to insert in the lower arm in the lock body 1. As each groove 51 has a vertical wall near to the free end and a sloped wall far from the free end so that the hook arm 5 can be adjusted in position in relation to the lock body 1 by means of the sloped walls of the grooves 51 sliding under the two feet of the inverted U-shaped member 211 only inward in the lower arm of the lock body 1, and the opening 125 is to be passed through by the free end of the lower arm of the hook rod 5 for convenience to adjust the position of the hook rod 5 in relation to the lock body 1. And the two feet of the inverted U-shaped member 211 can engage any of the grooves 51 to stop the hook rod 5 immovable to lock this lock, preventing the hook rod 5 from pulled out of the lower arm in the lock body 1.

In order to unlock this lock, in other words, to separate the hook rod 5 from the lock body 1, a magnet provided in the remote electronic controller is to be moved to the proximity of the spring switch 23 to turn it on and then the LED lamp is to be lit up so that the electronic device can receive a signal from the remote controller. Then a button OPEN in the remote controller is pressed to transmit a signal, which is received by the receiver 24, and then fed to the comparator 25, the amplifier 26 and the decoder 27, which then sends out a signal in a mono pulse for about 15 seconds to the transistor Q1. Then the transistor Q1 turns on the magnetic switch 21 to suck up the inverted U-shaped member 211, the two feet of which then are separated from two of the grooves 51, allowing the rod 5 pulled out of the lock body 1 to unlock this lock during the time when the U-shaped member 211 is sucked up.

For applying this lock on a steering wheel of an automobile, an elongated rod 6 with a hook at one end is provided, as shown in FIG. 5. The elongated rod 6 has a male thread in the other end to screw with the female threads 112, 124 in the left half post 111 and the right half post 123 and a proper length to hook a brake pedal in an automobile so as to lock the steering wheel immovable. For unlocking, the same operation mentioned above is to be made.

While the preferred embodiments of the invention have been described above, it will be recognized and understood that various modifications may be made therein and the appended claims are intended to cover all such modifications which may fall within the spirit and scope of the invention.

What is claimed is:

1. A remote controlled automobile and motorcycle lock comprising:
    a U-shaped lock body consisting of a left half body and a right half body combined together, said left and right half bodies having a half female thread at an end of an upper arm, both said half female threads making up a complete female thread when both said half bodies are combined together, said left half body having a small hole in a proper location for an LED lamp to fit in, and said right half body having an opening in a vertical end wall for a lower arm of a hook rod to pass through;
    an electronic device panel fixed with an electronic device including a magnetic switch combined with an inverted U-shaped member at its bottom, a biasing spring being placed between the magnetic switch and the U-shaped member, said inverted U-shaped member being drawn up by the magnetic switch when said magnetic switch is turned on by a signal from a remote electronic controller, an LED lamp fitting in the hole in the left half body and a spring switch to be turned on by a magnet in the remote electronic controller;
    a battery unit in the upper arm in the lock body to supply power to the electronic device;
    a T-shaped cap for closing the end of the upper arm in the lock body to keep the battery unit therein, having a male-threaded stud to screw with the female thread in the upper arm;
    a U-shaped hook rod having an upper rod arm and a lower rod arm extending parallel to each other, the upper rod arm being tubular and shorter than the lower rod arm, said lower rod arm having a plurality of grooves equally spaced apart near a free end thereof, said upper rod arm fitting around the upper arm of the lock body, said lower arm fitting in the lower arm in the lock body, each said groove having a vertical wall near to the free end and a sloped wall far from the free end so that said hook lower arm can be pushed inward in the lock body freely with the sloped walls sliding under two feet in said inverted U-shaped member, but said lower rod arm can be stopped by the vertical wall of any groove when said lower rod arm is pulled outward in the lock body; and,
    said inverted U-shaped member being drawn up by said magnetic switch in said electronic device, separated from any of said grooves in the lower arm in said hook arm, allowing said hook arm being pulled out of the lock body in unlocking this lock, when said remote controller sends out a wireless signal to said electronic device contained in said lock body.

2. The remote controlled automobile and motorcycle lock as claimed in claim 1, wherein said right half body has two position blocks spaced apart on the inside wall for said inverted U-shaped member to be fitted between them so as to move up and down therein.

3. The remote controlled automobile and motorcycle lock as claimed in claim 1, wherein said lock body has a rearward post consisting of a right half post in the right half body and a left half post in the left half body, and said post is provided with a female thread to screw with a male thread in one end of an elongated rod with a hook fixed at the other end so that this lock can be applied to lock a steering wheel of an automobile immovable.

* * * * *